Feb. 11, 1930.  A. C. JACOBSON  1,746,594
SAWING MACHINE
Filed Jan. 18, 1926   2 Sheets-Sheet 1
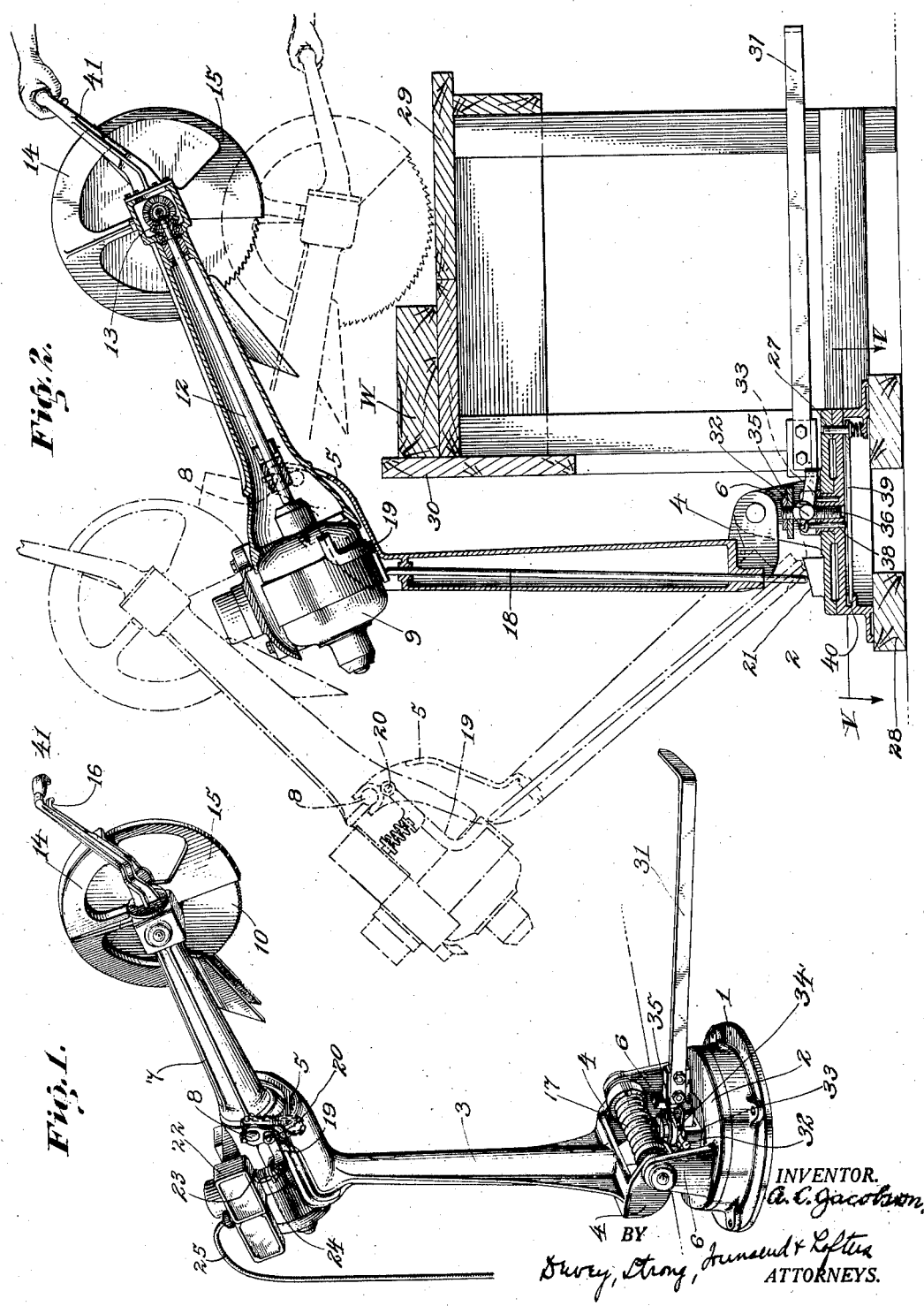
INVENTOR.
A. C. Jacobson
BY
Dewey, Strong, Townsend & Loftus
ATTORNEYS.

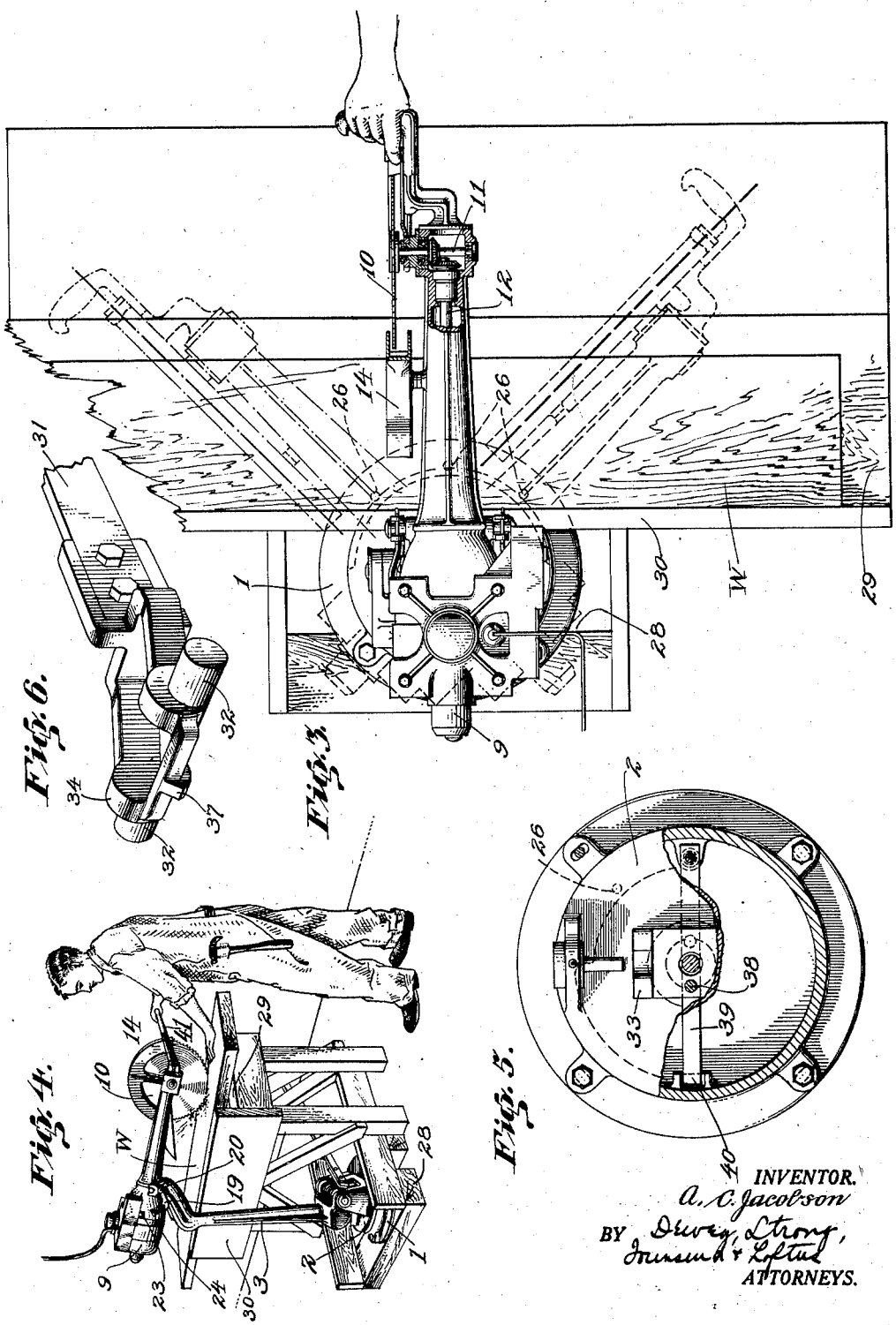

Patented Feb. 11, 1930

1,746,594

UNITED STATES PATENT OFFICE

AXCEL C. JACOBSON, OF SAN FRANCISCO, CALIFORNIA

SAWING MACHINE

Application filed January 18, 1926. Serial No. 81,938.

This invention relates to sawing machines, and particularly to an improved power-operated wood-working saw. My improved sawing machine is swivelly mounted on a base adapted to be secured to a support adjacent the work table. The swiveled portion of the base pivotally carries an upright which pivotally supports a saw-carrying arm at a position above the table. The arrangement is such that the saw-carrying arm is free to be moved horizontally and vertically in the positioning and sawing operations and when not in use the pivotal arrangement of the upright on the base adapts the entire device to be moved rearwardly entirely away from the work table. By such an arrangement the operator has free use of the table in arranging the work and, after the work is positioned, he can bring the saw forwardly thereto.

It is an object of my invention to provide an improved sawing machine of this type.

Another object of my invention is the provision of means cooperating with the swivelled base for definitely setting and positively holding the same to different indexed positions, and other means for releasing the same from such positions and for frictionally holding the swivelled base in any other swivelled position desired. By this arrangement, the device may be set to saw any degree of mitre, means being provided for positively locating the zero and 45° points.

A further object of the invention resides in providing novel means for counterbalancing the several parts of the machine and cushioning the same, whereby they can be easily moved in the operation without shocks, and means automatically controlling the saw-driving motor to operate only when the saw is brought to a position adjacent the work.

With the above and other objects in view, as will hereinafter appear, my invention consists in the features of construction and operation set forth in the following specification and illustrated in the accompanying drawings. In such drawings annexed hereto and forming a part of this specification, I have illustrated certain specific embodiments of my invention, but it will be understood that the invention can be otherwise embodied and that the drawings are not to be construed as defining or limiting the scope of the invention, the claims appended to this specification being relied upon for that purpose.

Referring to the figures of the drawings:

Fig. 1 is a perspective view of my improved sawing machine.

Fig. 2 is a sectional side elevation thereof, showing the same in cooperating relation with a work table.

Fig. 3 is a plan view of Fig. 2.

Fig. 4 is a perspective view of Figs. 2 and 3.

Fig. 5 is a detail sectional view, taken on line V—V of Fig. 2.

Fig. 6 is an enlarged detail view of the base clamping and releasing lever.

In the drawings, 1 indicates the stationary base, on which is swivelly mounted a movable base 2. An upright 3 has laterally extending ends 4 and 5, the lower extension 4 being pivotally mounted on lugs 6 on the base 2. A saw-carrying arm 7 is pivoted on trunnions 8 on the upper lateral extension 5.

An electric motor 9 is carried on the end of the arm rearwardly of the trunnions 8. A circle saw 10 is mounted on the end of a transverse shaft 11 in the other end of the arm. The saw is driven from the motor by a shaft 12 and bevel gears 13. The arm 7 is constructed as a housing which forms a complete closure protecting the driving end of the motor and the entire driving connections therefrom to the saw. A fixed guard 14 and a movable guard 15 are provided about the saw. The movable guard is adapted to be moved upwardly into the guard 14 by the auxiliary handle 16 when engaging the saw with the work, as defined in my co-pending application Serial Number 81,940 filed January 18, 1926.

A spring 17, extending about the pivot axis of the upright 3, acts on the upright to prevent free swinging movement thereof. This spring somewhat counterbalances the weight of the arm 7 and prevents quick dropping movement of the upright either forwardly or rearwardly in a manner which would cause shock apt to either break or upset the parts supporting the upright. The relative weight of the motor is such that it normally raises the saw upwardly about the trunnions 8, as shown in full lines in Fig. 2. When in such position the operator can give the saw a push rearwardly, whereupon it will drop backward to the position shown in dot and dash lines without shock or injury, due to the counterbalancing action of the spring 17.

A saddle 19 is pivoted to the yoke extension 5 at 20, the free end thereof acting as a support for the motor end of the arm 7. Cooperating with this saddle is a rod 18 extending longitudinally through the upright 3 and resting upon an inclined support 21 on the base 2.

It will be noted that as the upright moves backwardly the rod is moved upwardly at a corresponding speed in a manner raising the saddle 19 about its pivot. The motor 9 is thereby supported with the arm 7 at a convenient angle, with the saw considerably forward of the motor, whatever may be the position of the upright. If the rod was not provided for thus adjustably supporting the motor, the arm 7 in the forward position of the upright would extend in a nearly vertical direction and the saw would be out of convenient reach of the operator.

A standard automatic contact switch for controlling the motor is provided in a box 22. This switch is normally closed in a manner operating the motor (see Fig. 4). However, when the arm is permitted to move to the inoperative position shown in Figs. 1 and 2, the button 23 of the switch engages the resilient stop 24 on the saddle 19 and is depressed in a manner opening the switch. When the arm is moved downwardly about the trunnions 8 from the position shown in full lines in Fig. 2, the switch automatically closes and starts the motor and saw which reach their full cutting speed by the time the saw reaches the work. A socket is provided in the box 22 for receiving a direct electrical connection 25.

The base 2 is provided with three index holes 26 placed 45° apart, and the base 1 is provided with a spring pin 27 cooperating with these holes. The base 1 is illustrated as mounted on the base portion 28 of a work bench or table 29 in such a position that when the pin 27 is in the middle hole 26, the arm and saw will be at right angles to the straight edge 30 of the table. With the parts in such position, a piece of work W placed against the edge 30 will be sawed at a right angle thereacross. With the pin located in one of the outer holes 26, the work would be sawed at an angle of 45°.

A lever 31 and cooperating means are provided for releasing the pin 27 and frictionally holding the base 2 in any angular position desired. As illustrated in Fig. 6, the inner end of this lever is provided with a pair of trunnions 32 for resting on upwardly extending lugs 33 on the base 2. Cams 34 adjacent the trunnions are adapted to engage against a plate 35, connected to the base 1 by a threaded stud 36. By this arrangement (Fig. 2), when the lever is forced downwardly, the cams draw the bases 1 and 2 into tight frictional engagement.

A lug 37 on the forward end of the lever 31 cooperates with a pin 38 resting on a plate 39. One end of the plate 39 is pivoted at 40, and the other end engages the pin 27 in a manner withdrawing the pin from the hole 26 when the pin 38 is depressed. Thus, upward movement of the lever 31 is adapted to depress the pin 38 and release the locking pin 27, and downward movement of the lever is adapted to draw the bases 1 and 2 into tight frictional engagement.

The operation of my improved sawing machine is believed to be obvious. The device normally occupies the position shown in dot and dash lines in Fig. 2. In such position, the work table is entirely clear and the work can be conveniently arranged thereon without interference by the saw. With the work in place, the operator grasps the handle 41 and draws the saw forwardly to the position shown in full lines in Fig. 2. Continued movement of the saw downwardly to the position shown in dash lines in Fig. 2 and in full lines in Fig. 4, moves the switch away from the stop 24 and starts the motor. Thus, by the time the saw reaches the work, it has attained a momentum which efficiently performs the sawing operation. It will of course be understood that the lever 31 can be operated to secure the base 2 in any position desired in the manner above described.

After each sawing operation, the saw can be raised upwardly and the entire device given a push to the rearward position, the spring 17 and rod 18 and their cooperating parts serving to automatically care for the device when moved in this manner. It will, furthermore, be noted that the arm 7, which is the entire sawing unit, including the motor 9, is so mounted on the trunnions in the yoke 5 that the same can be freely lifted therefrom. This construction is advantageous for various reasons. The arm can be removed and locked up each night or when not in use. If used outside, the arm can be removed and carried inside in case of rain. Also the arm can be removed and used as a portable power-operated saw on work too large to be placed on the table.

Having thus described my invention, what I claim is:

1. A sawing machine comprising the combination of a stationary base, a movable base mounted to swivel thereon in a horizontal plane, an upright pivoted on the movable base for movement in a vertical plane, a yoke on the upper end of the upright having two relatively spaced and axially aligned recesses adapted to receive trunnions therein, a relatively angular arm mounted in the yoke and having trunnions resting in the recesses in a manner pivotally mounting the arm for vertical movement, an electric motor on the arm at the rear side of the trunnions, a circle saw on the arm at the front side of the trunnions, and an operative driving connection from the motor to the saw, the arm being freely removable from the yoke.

2. A sawing machine comprising the combination of a stationary base, a movable base mounted to swivel thereon on a horizontal plane, an upright pivoted on the movable base for movement in a vertical plane, the upper end of the upright being forked to provide a yoke having an open recess in each fork, a relatively angular housing mounted for vertical pivotal movement in the yoke by trunnions resting in the recesses, an electric motor on the arm at the rear side of such pivot, a circle saw on the arm at the front side of the pivot, an operative driving connection from the motor to the saw and including a shaft extending longitudinally within the housing, the housing entirely enclosing the inner end of the motor and the said shaft and driving connections to the saw, and a handle carried on the housing adjacent the saw, the housing being freely removable from the yoke by lifting the trunnions from the recesses.

3. A sawing machine comprising the combination of a stationary base, a movable base mounted to swivel thereon in a horizontal plane, an upright pivoted on the movable base for movement in a vertical plane, a relatively angular arm pivoted for vertical movement to the upper end of the upright, an electric motor on the arm at the rear side of the arm pivot, a circle saw on the arm at the front side of the arm pivot, an operative driving connection from the motor to the saw, a handle carried on the front end of the arm, and spring means cooperating with the upright to counterbalance and cushion the pivotal movement thereof.

4. A sawing machine comprising the combination of a stationary base, a movable base mounted to swivel thereon in a horizontal plane, an upright pivoted on the movable base for movement in a vertical plane, a relatively angular arm pivoted for vertical movement to the upper end of the upright, an electric motor, a circle saw carried on the free end of the arm, an operative driving connection from the motor to the saw, a handle on the arm, means for definitely setting and positively holding the movable base in two definite swivelled positions 45° apart, and a clamping and releasing lever co-operating with the two said bases, movement of the lever in one direction being adapted to frictionally bind the two bases together and movement thereof in the opposite direction being adapted to release the said positive holding means.

5. A sawing machine comprising the combination of a stationary base, a movable base mounted to swivel thereon in a horizontal plane, an upright having the two ends thereof extending laterally in the same direction, the lower lateral extension being pivoted for vertical movement to the movable base, a laterally extending arm pivotally mounted on the upper extension, an electric motor on the arm at the rear side of the arm pivot, a circle saw on the arm at the front side of the arm pivot, and a handle carried by the arm, the axes of the pivots at the two ends of the upright being parallel.

6. A sawing machine comprising the combination of a base, an upright pivoted thereon for movement in a vertical plane, a relatively angular arm pivoted for vertical movement to the upper end of the upright, an electric motor on the arm at the rear side of the arm pivot, a circle saw on the arm at the front side of the arm pivot, an operative driving connection from the motor to the saw, a handle on the arm, a longitudinally movable rod carried by the upright and cooperating with the rear end of the arm to adjustably support the same in its different positions, and means on the base adjustably supporting the rod in the different positions of the upright.

7. A sawing machine comprising the combination of a base, an upright pivoted thereon for movement in a vertical plane, a relatively angular arm pivoted for vertical movement to the upper end of the upright, an electric motor on the arm at the rear side of the arm pivot, a circle saw on the arm at the front side of the arm pivot, an operative driving connection from the motor to the saw, a handle on the arm, a normally closed switch on the arm for controlling the motor, a saddle pivoted to the upright, the motor normally counterbalancing the saw and resting on the saddle, a stop on the saddle adapted to engage and open the switch when the motor rests on the saddle, a longitudinally movable rod carried by the upright and cooperating with the saddle to support the same, and means on the movable base adjustably supporting the rod in the different positions of the upright, the stop being adapted to be engaged by and open the switch when the arm is moved upwardly away from the work and the motor rests on the saddle.

AXCEL C. JACOBSON.